United States Patent
Saha et al.

(10) Patent No.: US 11,461,650 B2
(45) Date of Patent: Oct. 4, 2022

(54) VALIDATION OF DEEP NEURAL NETWORK (DNN) PREDICTION BASED ON PRE-TRAINED CLASSIFIER

(71) Applicant: FUJITSU LIMITED, Kawasaki (JP)

(72) Inventors: Ripon K Saha, Santa Clara, CA (US); Mukul R Prasad, San Jose, CA (US); Seemanta Saha, Goleta, CA (US)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 16/830,563

(22) Filed: Mar. 26, 2020

(65) Prior Publication Data
US 2021/0303986 A1 Sep. 30, 2021

(51) Int. Cl.
*G06N 3/08* (2006.01)
*G06F 16/28* (2019.01)
*G06F 16/55* (2019.01)

(52) U.S. Cl.
CPC .............. *G06N 3/08* (2013.01); *G06F 16/285* (2019.01); *G06F 16/55* (2019.01)

(58) Field of Classification Search
CPC ...... G06N 20/00; G06N 3/084; G06N 3/0454; G06N 20/10; G06N 20/20; G06F 16/285; G06F 16/55
See application file for complete search history.

(56) References Cited

PUBLICATIONS

Kim Jinhan, et al., "Guiding Deep Learning System Testing using Surprise Adequacy," Proceedings of the 41st International Conference on Software Engineering, Aug. 25, 2018, IEEE Press, 12 pages.
Jiang et al., "To Trust Or NotTo Trust A Classifier," Advances in Neural Information Processing Systems, Oct. 26, 2018, pp. 5541-5552, 32nd Conference on Neural Information Processing Systems (NIPS 2018), Montreal, Canada.
Ribeiro, et al., "Why Should I Trust You?: Explaining the predictions of any classifier," Proceedings of the 22nd ACM SIGKDD International Conference on Knowledge Discovery and Data Mining, Aug. 9, 2016, 10 pages, DOI: http://dx.doi.org/10.1145/293672.2939778.
Selvaraju, et al. "Grad-CAM: Visual Explanations from Deep Networks via Gradient-based Localization," Proceedings of the IEEE International Conference on Computer Vision, Dec. 3, 2019, 23 pages.

*Primary Examiner* — Hau H Hoang
(74) *Attorney, Agent, or Firm* — Fujitsu Patent Center

(57) ABSTRACT

According to an aspect of an embodiment, operations may include receiving a first data point associated with a real-time application and predicting a first class for the received first data point, by a Deep Neural Network (DNN) pre-trained for a classification task of the real-time application. The operations may further include extracting, from the DNN, a first set of features and a corresponding first set of weights, for the predicted first class. The extracted first set of features may be associated with a convolution layer of the DNN. The operations may further include determining, by a pre-trained classifier associated with the predicted first class, a confidence score for the predicted first class based on the extracted first set of features and the corresponding first set of weights. The operations may further include generating output information to indicate correctness of the predicted first class based on the determined confidence score.

20 Claims, 6 Drawing Sheets

VALIDATION OF DEEP NEURAL NETWORK (DNN) PREDICTION BASED ON PRE-TRAINED CLASSIFIER

FIELD

The embodiments discussed in the present disclosure are related to validation of deep neural network (DNN) prediction based on pre-trained classifier.

BACKGROUND

Recent advancements in the field of neural networks have led to development of various techniques for classification of data which may be associated with various real-time applications. For example, a trained Deep Neural Network (DNN) may be utilized in different applications for various classification tasks, such as classification or detection of different data points (i.e. an image). Though DNNs have achieved a good classification accuracy in various classification tasks, however, in certain applications, such as autonomous driving or medical diagnosis, an incorrect detection or mis-classifications (in even a fraction of cases) may lead to financial or physical losses.

Typically, a native confidence score associated with the DNN may be used to predict or classify the data points. However, in certain situations, the native confidence score associated with the DNN may not be an accurate predictor which may further lead to the incorrect classification or prediction of the data points. There are certain conventional systems which may validate the reliability of the prediction or output of various classical machine learning models. However, such conventional systems, may not be suitable enough to effectively determine the reliability of the DNN due to high dimensional nature of the data used in the DNN.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include receiving a first data point associated with a real-time application. The operations may further include predicting, by a Deep Neural Network (DNN) pre-trained for a classification task of the real-time application, a first class associated with the received first data point. The operations may further include extracting, from the DNN, a first set of features and a first set of weights corresponding to the first set of features, for the predicted first class of the first data point. The extracted first set of features may be associated with a convolution layer of the DNN. The operations may further include determining, by a pre-trained classifier associated with the predicted first class, a confidence score for the predicted first class for the first data point based on the extracted first set of features and the corresponding first set of weights. The operations may further include generating output information to indicate correctness of the prediction of the first class for the first data point based on the determined confidence score.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
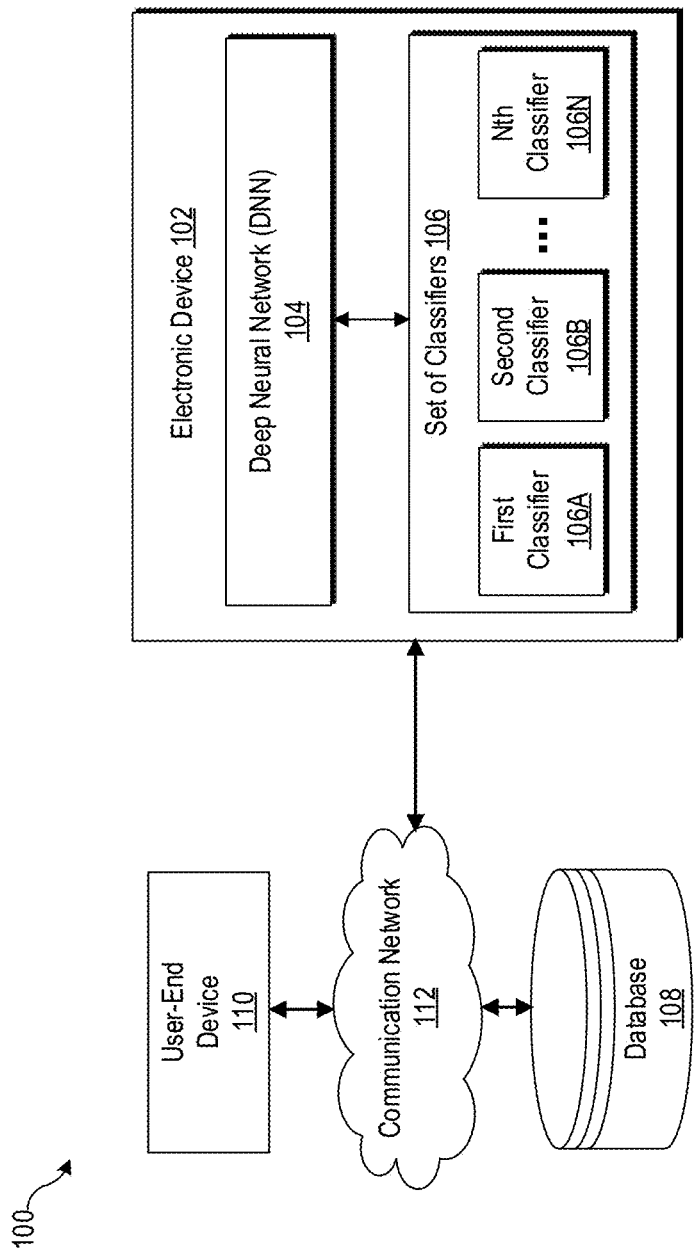
FIG. 1 is a diagram representing an example environment related to validation of a prediction result of a deep neural network (DNN) based on a pre-trained classifier.

Some embodiments described in the present disclosure relate to methods and systems for effective validation of prediction results of a Deep Neural Network (DNN). In the present disclosure, a set of pre-trained classifiers, corresponding to a set of classes associated with the DNN, may be used to validate the prediction results of the DNN. The set of pre-trained classifiers may be orthogonal or independent to the DNN, which may be trained to predict or classify data points of the set of classes. The validation of the prediction results of the DNN may provide trust or reliability on the prediction of the DNN, and may be based on analysis of a set of relevant features (may be correct or wrong) of the DNN, which may be responsible or used for the prediction (i.e. either correct or incorrect) of a particular class.

According to one or more embodiments of the present disclosure, the technological field of classification by the DNN may be improved by configuring a computing system in a manner the computing system is able to effectively determine an accuracy or a reliability of a prediction result of the DNN. The computing system may include at least one classifier (i.e. pre-trained on a certain class associated with the DNN) which may validate a prediction result of the DNN to further improve an accuracy of the prediction, as compared to other conventional systems which may validate the prediction result of classical machine learning models.

The system may be configured to receive a data point associated with a real-time application. Example of the data point may include, but is not limited to image data, speech data, audio data, text data, or other forms of digital signals. The system may be further configured to predict a class associated with the received data point, by a DNN pre-trained for a classification task associated with the real-time application. For example, the classification task may be an image classification task and the data point may include an input image of an animal (such as, a cat). The system may be configured to control the DNN to predict the class (for example a label of a cat) based on the received data input (for example the input image of the cat).

The system may be further configured to extract, from the DNN, a set of features and a set of weights corresponding to the set of features, for the predicted class of the input data point. The set of features may be associated with a convolution layer of the DNN. For example, the convolution layer may precede an output layer of the DNN. The extracted set of features may be extracted and/or selected to determine the correctness of the prediction of the DNN. For example, the system may select top N number of the features, and may further use the selected features and the corresponding weights to determine the correctness or the trust score of the prediction of the DNN.

The system may be further configured to control a pre-trained classifier for the predicted class, to determine a confidence score (or the trust score) for the class predicted by the DNN for the data point. The determination of the confidence score may be based on the extracted set of features and the corresponding set of weights. The confidence score may be indicative of the correctness or reliability of the DNN's prediction of the class for the data point. The indicative correctness or the trust score provided by the pre-trained classifier may further validate the prediction result of the DNN. The system may be further configured to generate output information based on the confidence score.

The set of features extracted and selected from the convolution layer of the DNN, may represent, for example, high level features that may be correlated with the predicted class of the data point. For example, in case of utilization of the DNN for an image classification task, where the data point may be an image to be classified into a class, such as, a type of animal (for example, a cat), the extracted set of features may correspond to the high level features of an animal, such as, a head, eyes, a nose, a tail, legs, and other relevant body parts of the animal. The system may control the pre-trained classifier for the predicted class (such as cat) to use (or get trained on) such high-level or relevant features and the corresponding weights of the image to provide an effective validation of the class predicted by the DNN for the input image. Further, utilization of a limited number of the high-level features (for example top N number of features) selected from the extracted set of features, by the pre-trained classifier (i.e. independent to the DNN), may further lead to minimization of dimensionality of the data associated with the DNN.

Embodiments of the present disclosure are explained with reference to the accompanying drawings.

FIG. 1 is a diagram representing an example environment related to validation of a prediction result of a deep neural network (DNN) based on a pre-trained classifier, arranged in accordance with at least one embodiment described in the present disclosure. With reference to FIG. 1, there is shown an environment 100. The environment 100 may include an electronic device 102. The electronic device may further include a deep neural network (DNN) 104. The electronic device 102 may further include a set of classifiers 106 that may include a first classifier 106A, a second classifier 106B, . . . and an Nth classifier 106N. The environment 100 may further include a database 108, a user-end device 110, and a communication network 112. The electronic device 102, the database 108, and the user-end device 110 may be communicatively coupled to each other, via the communication network 112.

Examples of the electronic device 102 may include, but are not limited to, a mobile device, a desktop computer, a laptop, a computer work-station, a training device, a computing device, a mainframe machine, a server, such as a cloud server, and a group of servers. In one or more embodiments, the electronic device 102 may include a user-end terminal device and a server communicatively coupled to the user-end terminal device. Examples of the user-end terminal device may include, but are not limited to, a mobile device, a desktop computer, a laptop, and a computer work-station.

The electronic device 102 may comprise suitable logic, circuitry, interfaces, and/or code that may be configured to perform one or more operations for validation of a prediction result of a deep neural network (DNN) based on a pre-trained classifier. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

In one or more embodiments, the electronic device 102 may be configured to receive a first data point from a plurality of data points in a dataset (i.e. stored in the database 108), via the communication network 112. In some embodiments, the electronic device 102 may be configured to store the first data point in a memory (not shown in FIG. 1) of the electronic device 102. The first data point may correspond to, but is not limited to, image data, audio data, speech data, or text data. The dataset may correspond to a real-time application which may perform a specific classification task. Examples of the real-time application may include, but are not limited to, an image recognition or classification application, a speech recognition application, a text recognition application, a malware detection application, an autonomous vehicle application, an anomaly detection application, a machine translation application, pattern recognition from different digital signals, such as, but not limited to, electrical bio signals, motion data, and depth data.

The electronic device 102 may be configured to control a pre-trained deep neural network (DNN) 104 to predict a first class (for example a label) associated with the received first data point 104. For example, in case the DNN 104 is pre-trained for an image classification task and the first data point is an image, the DNN 104 may be controlled to predict an object in the image, such as, an animal (e.g., a cat) as the first class. In some embodiments, the electronic device 102 may control the DNN 104 to generate a first confidence score (i.e. native confidence score as a probability value) which may indicate a prediction for the first class associated with the received data point.

The electronic device 102 may be further configured to extract a first set of features for the predicted first class from the pre-trained DNN 104. The first set of features may be associated with a convolution layer of the pre-trained DNN 104. The convolution layer may correspond to, but is not limited to, a layer of the pre-trained DNN 104 that precedes an output layer of the pre-trained DNN 104. The electronic device 102 may be further configured to extract a first set of weights that correspond to the first set of features, from the pre-trained DNN 104. In some embodiments, the electronic device 102 may use a gradient-based Class Activation Mapping (CAM) technique to extract the first set of features and the corresponding first set of weights from the pre-trained DNN 104.

The electronic device 102 may be further configured to control a classifier (for example, the first classifier 106A) associated with the first class, to determine a second confidence score for the first class predicted for the first data point by the DNN 104106. The second confidence score determined by the classifier may be different from the first confidence score generated by the pre-trained DNN 104. In some embodiments, the electronic device 102 may determine the second confidence score based on the first set of features and the first set of weights corresponding to the first set of features. The electronic device 102 may be configured to select the classifier (for example the first classifier 106A) from the set of classifiers 106 based on the prediction of the first class by the DNN 104 for the first data point. The details of the selection of the classifier is described, for example, in FIG. 3.

The electronic device 102 may be further configured to generate output information that may indicate a correctness of the prediction of the first class for the first data point based on the second confidence score determined by the classifier (such as the first classifier 106A). The indicated correctness of the prediction may further validate the prediction of the first class (i.e. or the classification of the data point into the first class) performed by the pre-trained DNN 104. In some embodiments, the output information may provide a probability of the correctness of the prediction performed by the DNN 104. The details of the first set of features, the classifier, and the validation of a prediction result of the DNN 104 are described in detail, for example, in FIGS. 3, 4, and 5. Although in FIG. 1, the set of classifiers 106 and the pre-trained DNN 104 are shown as a part of the electronic device 102; however, in some embodiments, the set of classifiers 106 and the pre-trained DNN 104 may be integrated as a single device, without a deviation from the scope of the disclosure. Alternatively, each of the set of classifiers 106 and the pre-trained DNN 104 may be implemented within a separate device, without a deviation from the scope of the disclosure.

The deep neural network (DNN) 104 may comprise suitable logic, circuitry, interfaces, and/or code that may configured to classify or recognize an input data point to generate an output result for the particular real-time application. For example, the pre-trained DNN 104 may recognize different objects in input images and may provide a unique label for each object in the input images. The unique label may correspond to different living (like human, animals, plants) or non-living entities (like, but not limited to, vehicle, building, computer, book, etc.). In another example, the pre-trained DNN 104 related to an application of speech recognition, may recognize different input audio samples to identify a source (e.g., a human-speaker) of the audio sample. In an embodiment, the output unique label may correspond to a prediction result of the DNN 104 for the input data point. The DNN 104 may be configured to output a first confidence score (as a native confidence score) which may indicate a probability (between 0 to 1) of the output prediction result of the DNN 104. For example, for the input data point as an animal (like cat), the trained DNN 104 may generate a higher first confidence score (for example 0.95 which is close to 1.0) to predict the input data point with the unique label as the animal (for example cat). The DNN 104 may be implemented using hardware including a processor, a microprocessor (e.g., to perform or control performance of one or more operations), a field-programmable gate array (FPGA), or an application-specific integrated circuit (ASIC). In some other instances, the DNN 104 may be a code, a program, or set of software instruction. The DNN 104 may be implemented using a combination of hardware and software.

In some embodiments, the DNN 104 may correspond to multiple recognition layers (not shown) for recognition of the input data points, where each successive layer may use an output of a previous layer as input. For example, the multiple recognition layer may include an input layer, one or more hidden layers, and an output layer. Each recognition layer may be associated with a plurality of neurons, each of which may be further associated with plurality of weights. During training of the DNN 104, the multiple recognition layers and the plurality of neurons in each layer may be determined from hyper-parameters of the DNN 104. Such hyper-parameters may be set before or while training the DNN 104 on a training dataset (i.e. for example different images of a particular class). The DNN 104 may be trained to adjust the plurality of weights at different layers based on the input data points and the output result (i.e. a ground truth) of the DNN 104.

Each neuron or node of the DNN 104 may correspond to a mathematical function (e.g., a sigmoid function or a rectified linear unit) with a set of parameters, tunable to train the DNN 104 for the relationship between the first data point (for example an image data), as the input of the DNN 104, and the prediction result or class as the output of the DNN 104. The set of parameters may include, for example, a weight parameter, a regularization parameter, and the like. Each neuron may use the mathematical function to compute an output based on one or more inputs from neurons in other layer(s) (e.g., previous layer(s)) of the DNN 104. All or some of the neurons of the DNN 104 may correspond to same or a different mathematical function.

In training of the DNN 104, one or more parameters (like weight) of each neuron of the DNN 104 may be updated based on whether an output of the final layer for a given input (from the training dataset) matches a correct result based on a loss function for the DNN. This update process may be repeated for same or a different input till a minima of loss function may be achieved and a training error may be minimized. Several methods for training the DNN are known in art, for example, gradient descent, stochastic gradient descent, batch gradient descent, gradient boost, meta-heuristics, and the like. The DNN 104 may include code and routines configured to enable a computing device, such as the electronic device to perform one or more operations for classification of one or more data inputs (i.e. for example image data) into one or more outputs (i.e. class labels).

Examples of the DNN 104 may include, but are not limited to, a recurrent neural network (RNN), an artificial neural network (ANN), a convolutional neural network (CNN), a CNN-recurrent neural network (CNN-RNN), R-CNN, Fast R-CNN, Faster R-CNN, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks.

Each of the set of classifiers 106 may comprise suitable logic, circuitry, interfaces, and/or code that may configured to classify an input data point into one of the set of classes associated with the DNN 104. Each classifier may be pre-trained for a certain class associated with the DNN 104, for classification of the input data point. For example, the first classifier 106A may be pre-trained to classify an input image into a class, such as, an animal associated with the input image. Each classifier of the set of classifiers 106 may be trained based on test dataset stored in the database 108. A classifier associated with a certain class (for example an animal) may be used to validate a prediction result of the DNN 104, where the prediction result may correspond to same class on which the classifier may be trained. For example, a classifier pre-trained for a particular class (for example, an animal) may be used to determine an accuracy or correctness of the prediction or classification result of the DNN 104 for the input image classified to the same class (i.e., an animal). In an embodiment, the pre-trained classifier (for example, the first classifier 106A) may be configured to determine the accuracy or correctness of the prediction result (i.e., a class predicted by the DNN 104 for the input data point) as a second confidence score associated with the predicted result (or the predicted class). The first classifier 106A may determine the second confidence score (as an orthogonal confidence score) for a predicted class, based on the first set of features and the corresponding first set of weights extracted from the DNN 104. The use of the set of classifiers 106 for the validation of the prediction results of the pre-trained DNN 104 is explained in detail, for example, in FIG. 3. The training of a classifier (for example the first classifier 106A) from the set of classifiers 106 is explained in detail, for example, in FIG. 6. Examples of the set of the classifiers 106 may include, but are not limited to, a decision tree classifier, a Support Vector Machine (SVM) classifier, a Naïve Bayes classifier, a Logistic Regression classifier, or a k-nearest neighbor classifier, or a combination thereof.

The database 108 may comprise suitable logic, interfaces, and/or code that may be configured to store the dataset including the plurality of data points related to the real-time application. The electronic device 102 may receive the first data point of the plurality of data points from the database 108. Further, the plurality of data points may include a set of training data points (or a training dataset) that may be used to train the DNN 104. The plurality of data points may further include a set of test data points (or a test dataset) which may be used to test the DNN 104 or train each of the set of classifiers 106 for the class predicted by the DNN 104. The database 108 may be a relational or a non-relational database that include the training dataset or the test dataset. Also, in some cases, the database 108 may be stored on a server, such as a cloud server or may be cached and stored on the electronic device 102. The server of the database 108 may be configured to receive a request to provide the test dataset from the electronic device 102, via the communication network 112. In response, the server of the database 108 may be configured to retrieve and provide the test dataset or a particular data point to the electronic device 102 based on the received request, via the communication network 112. In some embodiments, the database 108 may be configured to store the trained set of classifiers 106 associated with a corresponding class from the set of classes of the pre-trained DNN 104. In some embodiments, the database 108 may be configured to store the pre-trained DNN 104 for the particular real-time applications. In some embodiments, the database 108 may be configured to store the output information (i.e. indicate the correctness of the prediction of the DNN 104) generated by the set of classifiers 106. In some embodiments, the database 108 may store the extracted set of features based on which the set of classifiers 106 may be trained to generate the output information. Additionally, or alternatively, the database 108 may be implemented using hardware including a processor, a microprocessor (e.g., to perform or control performance of one or more operations), a field-programmable gate array (FPGA), or an application-specific integrated circuit (ASIC). In some other instances, the database 108 may be implemented using a combination of hardware and software.

The user-end device 110 may comprise suitable logic, circuitry, interfaces, and/or code that may be configured to store the real-time application where the specific classification task (i.e. for which the DNN 104 and the set of classifiers 106 are trained) may be performed. In some embodiments, the user-end device 110 may deploy the pre-trained DNN 104 and the set of classifiers 106 to validate the prediction results of the deployed pre-trained DNN 104. The user-end device 110 may utilize the deployed DNN 104 to perform the classification or detection task of the real-time application, and utilize the deployed set of classifiers 106 to validate the prediction or classification result generated by the deployed DNN 104. For example, the user-end device 110 may be an electronic device which may receive an input image from an in-built camera or a server and may perform the image classification or recognition on the input image based on the trained DNN 104 deployed on the user-end device 110. The user-end device 110 may further use a deployed pre-trained classifier (such as one of the set of classifiers 106) associated with a predicted image class, to determine an accuracy or reliability of classification of the image into the predicted image class performed by the DNN 104 (i.e. deployed on the user-end device 110). In another example, the user-end device 110 may be an autonomous vehicle which may receive real-time images from surrounding and detect different objects captured in the images through in-built trained DNN 104. In such scenario, the user-end device 110 may use a pre-trained classifier from the set of classifiers 106 to validate the prediction output of the DNN 104, and indicate or warn about a potential mis-judgement or incorrect detection, performed by the DNN 104 of the autonomous vehicle, to a user associated with the autonomous vehicle. In some embodiments, the user-end device 110 may take appropriate actions (for example apply brakes or control steering of the autonomous vehicle) based on the incorrection detection or mis-judgement performed by the DNN 104, deployed in the autonomous vehicle.

In another example, the user-end device 110 may be audio security system which may perform user authentication based on speech recognition performed by the DNN 104 trained on different speech data samples. Similarly, the user-end device 110 may validate the authentication of the user performed by the DNN 104, by use of an appropriate pre-trained classifier from the set of classifiers 106 to enhance the accuracy of authentication. It should be noted here that the aforementioned examples are not be construed as limiting for the disclosure, and the DNN 104 may be used many possible applications which have not been mentioned for the sake of brevity. Examples of the user-end device 110 may include, but are not limited to, a mobile device, a desktop computer, a laptop, a computer work-station, a computing device, a mainframe machine, a server, such as a cloud server, and a group of servers.

The communication network 112 may include a communication medium through which the electronic device 102 may communicate with the server which may store the database 108 and the user-end device 110. Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 108 and the user-end device 110. In addition, in some embodiments, the functionality of each of the database 108 and the user-end device 110 may be incorporated into the electronic device 102, without a deviation from the scope of the disclosure.

Figure 2:
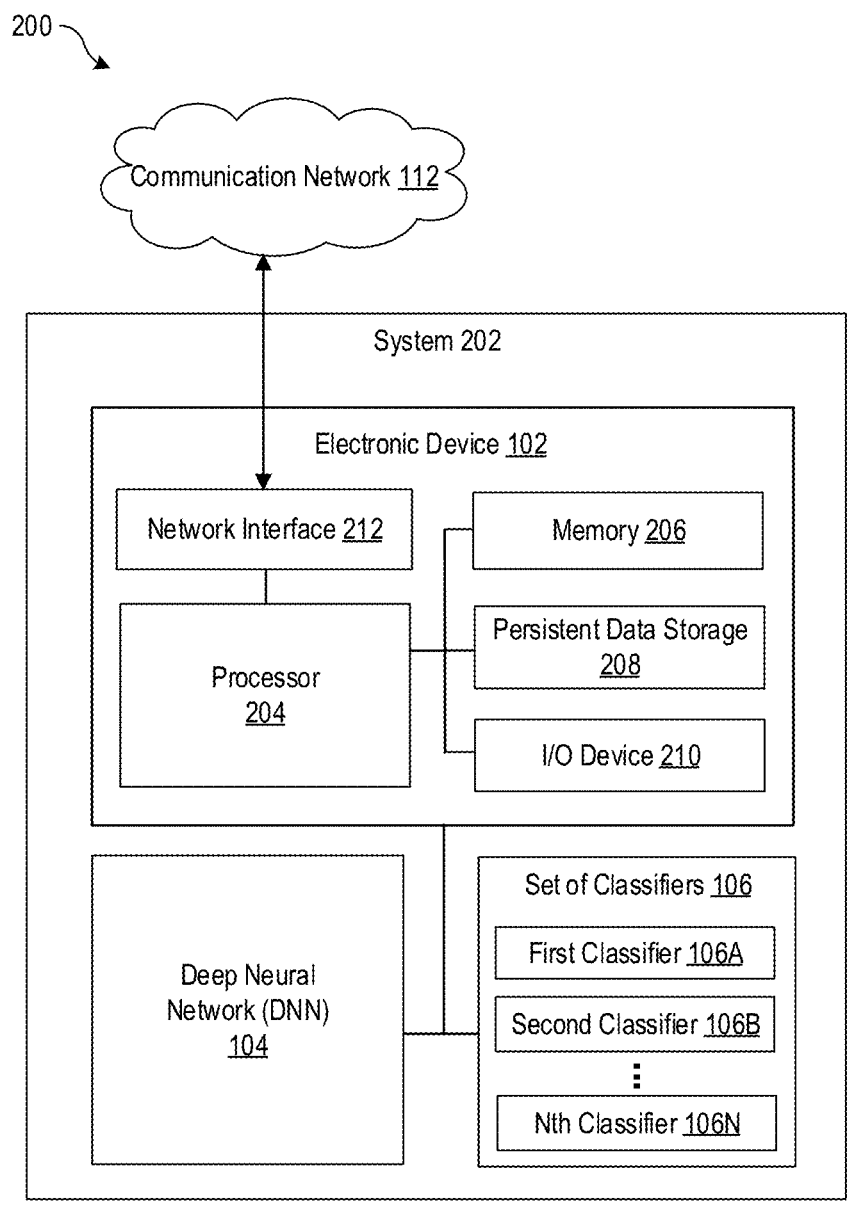
FIG. 2 is a block diagram of an example system for validation of a prediction result of a deep neural network (DNN) based on a pre-trained classifier.

FIG. 2 is a block diagram of an example system for validation of a prediction result of a deep neural network (DNN) based on a pre-trained classifier, arranged in accordance with at least one embodiment described in the present disclosure. FIG. 2 is explained in conjunction with elements from FIG. 1. With reference to FIG. 2, there is shown a block diagram 200 of an example system 202. The example system 202 may include the electronic device 102, DNN 104, and the set of classifiers 106. The electronic device 102 may include a processor 204, a memory 206, a persistent data storage 208, an input/output (I/O) device 210, and a network interface 212.

The processor 204 may comprise suitable logic, circuitry, and/or interfaces that may be configured to execute program instructions associated with different operations to be executed by the electronic device 102. For example, some of the operations may include reception of the first data point, control of the DNN 104 for the prediction of the first class associated with the received first data point, extraction of the first set of features and the first set of weights, selection of the first set of features, control of one of the set of classifiers 106 for the determination of the second confidence score, and generation of the output information. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures, and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, and/or interfaces that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the set of classifiers 106 and the DNN 104 as software instructions. The processor 204 may fetch the software instructions related to the set of classifiers 106 and the DNN 104 to perform different operations of the disclosed electronic device 102. In some embodiments, either of the memory 206, the persistent data storage 208, or combination may store the first data point and/or the training/test dataset, the first plurality of features, and the corresponding first plurality of weights.

The I/O device 210 may include suitable logic, circuitry, interfaces, and/or code that may be configured to receive a user input. The I/O device 210 may be further configured to provide an output in response to the user input. For example, I/O device 210 may receive a command or a handwritten text as a user input from a user, and the received user input may be used for training the DNN 104, training of a classifier from the set of classifiers 106, or validate the prediction result of the trained DNN 104. The I/O device 210 may include various input and output devices, which may be configured to communicate with the processor 204 and other components, such as the network interface 212. The I/O device 210 may include an input device or an output device. Examples of the input device may include, but are not limited to, a touch screen, a keyboard, a mouse, a joystick, and/or a microphone. Examples of the output device may include, but are not limited to, a display and a speaker.

The network interface 212 may comprise suitable logic, circuitry, interfaces, and/or code that may be configured to establish a communication between the electronic device 102, the database 108, and the user-end device 110, via the communication network 112. The network interface 212 may be implemented by use of various known technologies to support wired or wireless communication of the electronic device 102 via the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the example system 202 without departing from the scope of the present disclosure. For example, in some embodiments, the example system 202 may include any number of other components that may not be explicitly illustrated or described for the sake of brevity.

Figure 3:
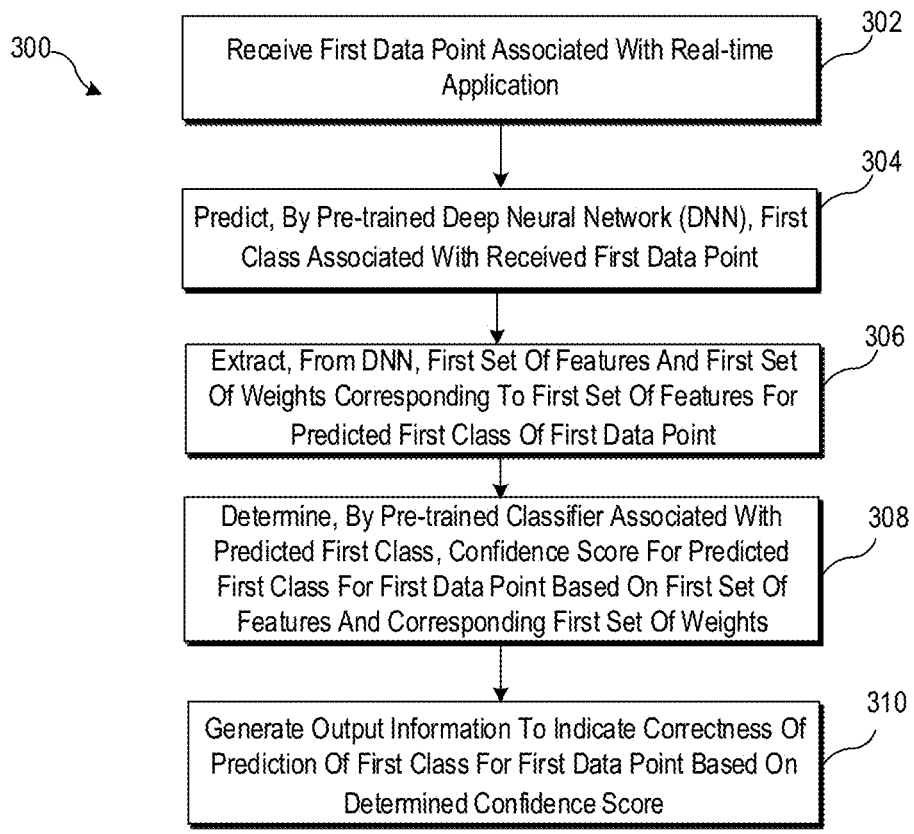
FIG. 3 is a flowchart of an example method for validation of a prediction result of a deep neural network (DNN) based on a pre-trained classifier.

FIG. 3 is a flowchart of an example method for validation of a prediction result of a deep neural network (DNN) based on a pre-trained classifier, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as the example electronic device 102 of FIG. 1 or the example system 202 of FIG. 2. For example, one or more of the electronic device 102, the pre-trained DNN 104, or a classifier from the set of classifiers 106 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a first data point may be received. The first data point may be associated with a real-time application. For example, the first data point may include, but is not limited to, an image, audio/speech samples, text characters, software instructions, or other forms of digital signals, such as but not limited to, electrical bio-signals, motion data, or depth data. Examples of the real-time applications may include, but are not limited to, an image recognition application, an image classification application, a speech recognition application, a text recognition application, a malware detection application, an autonomous vehicle application, an anomaly detection application, a machine translation application, or pattern recognition application from digital signals/data.

In some embodiments, the processor 204 may be configured to receive the first data point (for example, an image) from a plurality of data points in a dataset that may be stored in either or combination of the memory 206, the persistent data storage 208, or the database 108. The first data point (for example an image) may be received for classification or prediction into a particular class label, where the classification or prediction may be performed by the pre-trained DNN 104.

At block 304, a first class associated with the received first data point may be predicted. The pre-trained DNN 104 may be controlled to predict the first class associated with the received first data point. In one or more embodiments, the processor 204 may be configured to control the DNN 104 to predict the first class for the received first data point. For example, in case the DNN 104 is pre-trained for image classification tasks and the first data point is an image, the pre-trained DNN 104 may predict the first class as a living object (e.g., an animal, plant, or a human) or a non-living object (e.g., a building, a vehicle, a street, a symbol, or any other object) for the image. In case, the image input to the DNN 104 is of a dog animal, then the DNN 104 may output a unique class label which may indicate the classification of the image into a dog label. The output class label may be considered as the prediction result of the DNN 104.

The DNN 104 may be configured to generate a first confidence score, as a native confidence score, of the DNN 104. The first confidence score may indicate a probability value (say between 0 to 1) to indicate the prediction result of the DNN 104. In other words, the first confidence score generated by the DNN 104 may indicate the prediction of the first class (i.e. class label) for the received input image (or the data point).

At block 306, a first set of features and a first set of weights corresponding to the first set of features may be extracted for the predicted first class of the first data point. In one or more embodiments, the processor 204 may be configured to extract the first set of features and the first set of weights corresponding to the first set of features from the pre-trained DNN 104. The processor 204 may extract the first set of features and the corresponding first set of weights from a convolution layer of the DNN 104. In an embodiment, the convolution layer from which the features are extracted may a layer of the DNN 104 that may precede an output layer of the DNN 104. In such case, the convolution layer may be a last convolution layer of the DNN 104. In some embodiments, the processor 204 may be configured to use a process of class activation mapping (CAM) to extract the first set of features and the corresponding first set of weights from the convolution layer of the DNN 104. The process of the class activation mapping (CAM) and the convolution layer of the DNN 104 from which the features (or a set of feature values) and the corresponding weights may be extracted are described in detail, for example, in FIG. 5.

With respect to an example, the first data point may be an image to be classified by the DNN 104. The first set of features may include features or characteristics of an object of the image, where the object may be identified or classified at the convolution layer of the DNN 104. Since the convolution layer associated with the first set of features may be a layer that precedes the output layer of the DNN 104 (or may be the last convolution layer), the first set of features may be high-level features associated with the first data point. In an example, if the object is an animal in the image, the high-level features of the convolution layer may correspond to various characteristics or body parts of the animal, such as, a head, eyes, a tail, and legs of the animal. Such high-level features may be relevant features on which the DNN 104 may be trained to potentially generate the prediction result as the first class for the input data point (such as the animal in the image). In other words, the trained DNN 104 may have used such high-level features for the prediction or classification (either correct or wrong) of the first class for the first data input. Further, the first set of weights may correspond to multipliers of the convolution layer that may be associated with such high-level features (or the first set of features). The multiplier of a feature may provide a weightage or an importance to the feature with respect to the other features, to determine an output of the convolution layer at the output layer of the DNN 104. The extraction of the first set of features and the first set of weights from the DNN 104 is explained in detail, for example, in FIG. 5.

In some embodiments, the processor 204 may be configured to extract a second set of features and a second set of weights corresponding to the second set of features from the convolution layer of the DNN 104. The second set of features may include the first set of features. In order words, a number of the first set of features may be less or equal than a number of the second set of features or the first set of features may be a subset of the second set of features. Further, the processor 204 may be configured to select the first set of features from the extracted second set of features based on the second set of weights. In such scenario, the extraction of the first set of features may correspond to the selection of the first set of features from the second set of features. The extraction of the second set of features and the selection of the first set of features from the second set of features is explained in detail, for example, in FIG. 4.

At block 308, a confidence score may be determined for the predicted first class of the first data point. In one or more embodiments, the processor 204 may be further configured to control a classifier (for example, the first classifier 106A) to determine the confidence score (or the second confidence score) for the first class predicted by the DNN 104 for the first data point. The classifier (for example, the first classifier 106A) may be associated with the predicted first class of the first data point. Since the classifier (for example, the first classifier 106A) is independent from the DNN 104, therefore, the second confidence score generated by the first classifier 106A may be referred as an orthogonal confidence score which may be different from the first confidence score (i.e. native confidence score) generated by the pre-trained DNN 104.

In some embodiments, the first classifier 106A may determine the second confidence score for the predicted class based on the extracted or selected first set of features and the first set of weights corresponding to the first set of features. Examples of the first classifier 106A (or other of the set of classifiers 106) may include, but are not limited to, a decision tree classifier, a Support Vector Machine (SVM) classifier, a Naïve Bayes classifier, a Logistic Regression classifier, or a k-nearest neighbor classifier.

In an embodiment, the first set of features may include one or more first features of the convolution layer that may be related to the predicted first class, and may further include one or more second features of the convolution layer that may not be related (or may be lesser related) to the predicted first class. For example, for a predicted first class of an animal "cat" associated with an image, the one or more first features related to or important for the correct prediction of the first class may include, but not limited to, distinctive head, eyes, or ears. Further, the one or more second features that may be of lesser importance or which may lead to an incorrect prediction of the first class may include, but not limited to, a body color, a tail, or fur, which may be common to other animals as well. In an embodiment, the processor 204 may control or use the first classifier 106A to determine the second confidence score based on a correlation of the one or more first features with a correct prediction of the first class and based on another correlation of the one or more second features with an incorrect prediction of the first class. Each feature from the one or more first features and the one or more second features may include a set of feature values. The correlation of the one or more first features with the correct prediction or the correlation of the one or more second features with the incorrect prediction of the first class may be based on the set of feature values and the weight corresponding to each feature as described, for example, in FIGS. 5 and 7.

In an example, the first classifier 106A for the predicted first class may be a pre-trained decision tree classifier that may include a set of internal nodes and a set of leaf nodes. Each of the set of internal nodes of the decision tree classifier may represent a condition associated with a feature of the first set of features and the corresponding weight of the feature. The condition may be with respect to the set of feature values of each feature of the first set of features and the weight corresponding each feature. Further, each of the set of leaf nodes may represent a prediction output of the decision tree classifier that may include the second confidence score associated with the predicted first class for the first data point. The conditions set in the set of internal nodes of the decision tree classifier based on the set of feature values of each feature, and determination of the second confidence score for the predicted first class of the first data point is explained in detail, for example, in FIG. 7.

In some embodiments, the processor 204 may be configured to select the classifier (for example the first classifier 106A) from the set of classifiers 106 for the first class predicted by the DNN 104 (for example at step 304 in FIG.

3). For example, the set of classifiers 106 may correspond to various classes on which the DNN 104 may be pre-trained for a particular classification task (such as image classification). Examples of such classes may include living objects (such as, animals, birds, plants, and humans) and non-living objects (such as, but not limited to, buildings, vehicles, streets, electronic devices, or any other object). In case, the predicted first class is a cat (i.e., an animal), the processor 204 may select, from the set of classifiers 106, a classifier (e.g., the first classifier 106A) associated with an animal or specifically a cat to further determine the second confidence score for the predicted first class (i.e., the cat). In an embodiment, the selected classifier (for example the first classifier 106A) may be pre-trained for the first class (i.e. the cat) predicted by the DNN 104 (i.e. predicted at step 304). The training of a classifier (e.g., the first classifier 106A) of the set of classifiers 106 for a particular class is explained in detail, for example, in FIG. 6.

At block 310, output information may be generated. In one or more embodiments, the processor 204 may be further configured to generate the output information based on the second confidence score determined by the selected or pre-trained classifier (for example the first classifier 106A). The generated output information may indicate a correctness of the prediction of the first class for the first data point, by the DNN 104. In other words, the generated output information may indicate the correctness of the prediction performed by the DNN 104 (at step 304 to classify the received first data point into the first class). In some embodiments, the second confidence score may correspond to a probability value between 0 to 1, such that the probability value closer to "1" may indicate a correct prediction of the first class for the first data point by the DNN 104, and the probability value closer to "0" may indicate an incorrect prediction done by the DNN 104, as the first class, for the received first data point. In other words, the second confidence score determined by the classifier (for example, the first classifier 106A orthogonal to the DNN 104) may indicate a trust or reliability score on the prediction performed by the DNN 104 or may validate the correctness of the prediction performed by the DNN 104 (say performed at step 304). In other words, the second confidence score may indicate a probability of correct prediction being performed by the DNN 104 during a real-time operation.

In an embodiment, the processor 204 may be further configured to compare the determined second confidence score with a predefined score threshold. The processor 204 may generate the output information to indicate the correctness of the prediction of the first class based on the comparison. For example, in case the second confidence score corresponds to a probability value between 0 to 1, the predefined score threshold may be 0.5. The output information generated by the processor 204 in such case may indicate a correct prediction of the first class when the determined confidence score is greater than 0.5 and may indicate the prediction of the DNN 104 as incorrect, when the second confidence score is less than 0.5 (i.e. predefined score threshold).

In an embodiment, the output information may correspond to at least one of, but not limited to, a display of the second confidence score on the I/O device 210, a storage of the second confidence score in a log file, or a notification/alert based on the second confidence score. For example, the user-end device 110 (or the electronic device 102) may display the second confidence score to a user along with the predicted first class on a display device to indicate a degree of correctness of the first class predicted by the DNN 104.

In another example, the user-end device 110 (or the electronic device 102) may store the determined second confidence score in a log file in a memory (such as the memory 206). For example, the log file may indicate how many times the DNN 104 has correctly predicted or not to determine the accuracy of the DNN 104 in a real-time operation (for example in an autonomous vehicle). In certain scenario, the second confidence score may be stored in the log file along with the predicted first class based on the comparison of the second confidence score with the predefined score threshold. For example, the second confidence score may be stored in the log file when the second confidence score is greater than (or less than) the predefined score threshold. In another example, the output information may be indicated as a notification (for example an alert or warning) to a user of the user-end device 110 (or the electronic device 102) based on the second confidence score determined by the selected classifier (for example the first classifier 106A). For example, in case, the user-end device 110 is an autonomous vehicle and the second confidence score is below the predefined score threshold (e.g., 0.5), the user-end device 110 (i.e., the autonomous vehicle) may notify a user (for example a passenger of the autonomous vehicle). The notification may include a warning or alert for the user to take control of the autonomous vehicle due to a potential wrong prediction of the first class (e.g., a wrong classification or mis-identification of an object that may be an obstacle) performed by the DNN 104 being deployed in the user-end device 110. In some embodiments, the output information generated by the electronic device 102 may correspond to certain automatic actions to be taken, for example, in case of incorrect prediction of the DNN 104 detected by the classifier (for example the first classifier 106A). For example, in case of detection of mis-classification or incorrect prediction performed by the DNN 104 for the received first data point in the autonomous vehicle, the user-end device 110 or the electronic device 102 may generate the output information to automatically apply brakes, control steering, or significantly reduce speed of the autonomous vehicle.

Hence, the disclosed electronic device 102 which may include the classifier orthogonal or independent of the DNN 104 may determine the second confidence score (or a trust score) to determine the correctness of the prediction of the DNN 104. This may further enhance the accuracy of the prediction or classification of the DNN 104, by appropriate detection of mis-classification or incorrect prediction, and taking certain actions (as the output information) to avoid any financial or physical loss due to mis-predictions. The control may pass to end.

Although the flowchart 300 is illustrated as discrete operations, such as 302, 304, 306, 308, and 310. However, in certain embodiments, such discrete operations may be further divided into additional operations, combined into fewer operations, or eliminated, depending on the particular implementation without detracting from the essence of the disclosed embodiments.

Figure 4:
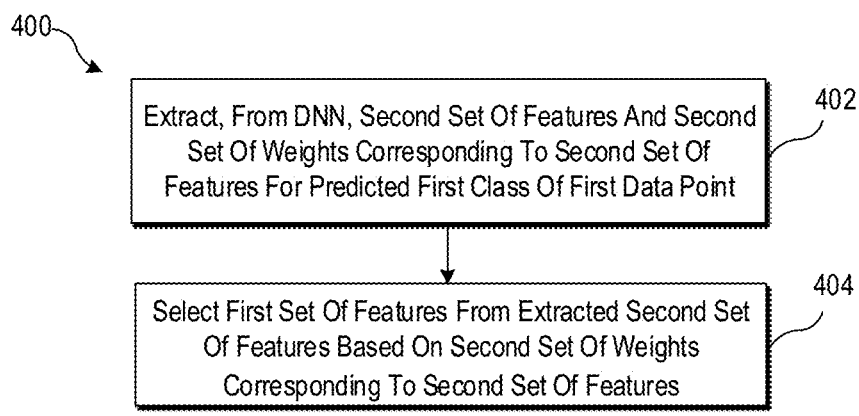
FIG. 4 is a flowchart of an example method for selection of a first set of features associated with a convolution layer of a Deep Neural Network (DNN)

FIG. 4 is a flowchart of an example method for selection of a first set of features associated with a convolution layer of a Deep Neural Network (DNN), according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the electronic device 102 of FIG. 1 or the example system 202 of FIG. 2. For example, one or more of the electronic device 102 or the set of classifiers 106 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

At block 402, the second set of features and the second set of weights corresponding to the second set of features may be extracted from the pre-trained DNN 104. In one or more embodiments, the processor 204 may be configured to extract the second set of features and the second set of weights corresponding to the second set of features from the convolution layer of the pre-trained DNN 104. For example, the convolution layer may correspond to a layer that may precede the output layer of the pre-trained DNN 104 as described, for example, at step 306 of FIG. 3. For example, the first data point input to the pre-trained DNN 104 may be an image to be classified by the DNN 104. The second set of features may include features or characteristics of an object in the image, where the object may be identified or classified at the convolution layer of the DNN 104. Since the convolution layer associated with the second set of features may be a layer that precedes the output layer of the DNN 104, the second set of features may be high-level features (for example head, eyes, tail, or legs in case the first class corresponds to an animal) associated with the first data point (for example an image of the animal). The second set of weights may correspond to a relative importance or a score assigned to each corresponding feature of the second set of features. In other words, a weight of a feature may be relative contribution of the feature in the determination of the prediction result or classification performed by the DNN 104 at the output layer, as explained, for example in FIGS. 3 and 5. In some embodiments, the processor 204 may be configured to use the process of class activation mapping (CAM) to extract the second set of features and the corresponding second set of weights from the convolution layer of the DNN 104, as described in detail, for example, in FIG. 5.

At block 404, the first set of features may be selected from the second set of features. In one or more embodiments, the processor 204 may be configured to select the first set of features from the second set of features based on the second set of weights corresponding to the second set of features. The first set of features, to be selected, may be a subset of the second set of features extracted from the convolution layer of the DNN 104. In some embodiments, the processor 204 may be configured to compare each of the second set of weights with a predefined weight threshold. The processor 204 may select the first set of features from the second set of features based on the comparison of the second set of weights with the predefined weight threshold. For example, a value of each of the second set of weights may lie between 0 to 1 and the predefined weight threshold may be 0.6. In such scenario, the processor 204 may compare each weight of the second set of weights with 0.6 and may select those features (as the first set of features) from the second set of features whose corresponding weight are greater than 0.6. Such selected features (with corresponding weight more than the predefined weight threshold) may be important or more related to the prediction of the first class. In an embodiment, the predefined weight threshold may be stored in the memory 206 for the particular predicted class. In some embodiments, the electronic device 102 may define different weight thresholds (i.e. for the selection of the first set of features) for different classes (for example an automobile, a bird, an animal, a flying object) predicted or classified by the pre-trained DNN 104.

In other embodiment, the processor 204 may be configured to sort the second set of features based on an application of a predefined sorting criteria on the second set of weights corresponding to the second set of features. For example, the processor 204 may sort the second set of features in a descending order (as the predefined sorting criteria) of the second set of weights corresponding to the second set of features. In other words, a feature having a higher weight (i.e. with more importance or relevance) may be sorted and placed before than a feature having a lower weight in the sorted second set of features. In an embodiment, the processor 204 may be configured to select the first set of features from the sorted second set of features. For example, the processor 204 may select those features that correspond to top-N weights (e.g., features with top 10 weights, i.e., the top 10 features by weights) as the first set of features from the extracted second set of features. The selected first set of features may be further used by the classifier (for example the first classifier 106A selected from the set of classifiers 106) to get trained, and further determine the second confidence score and the output information to indicate the correctness of the prediction performed by the DNN as explained, for example, in steps 308 and 310 in FIG. 3.

The selection of the first set of features (for example Top 10 high-level features) from the second set of features may reduce the high dimensionality associated with more number of feature sets of the DNN 104. This reduction in the dimensionality of the huge datasets and features in the DNN 104 may further improve the efficiency of the classifier that may be used for the validation of the predicted first class of the first data point. Further, the selection of features (i.e. the first set of features) having weights above a certain weight threshold or the selection of top weighted features from the second set of features may ensure that the selected first set of features may be relevant and as well as important for the accurate validation of the first class predicted by the DNN 104 of the first data point. In some cases, few features who may be responsible for the incorrect prediction or misclassification may also be an important feature to train the set of classifiers 106 and further validate the prediction result of the DNN 104 during a real-time operation. The training of the classifier is further described in detail, for example, in FIGS. 6 and 7.

Although the flowchart 400 is illustrated as discrete operations, such as 402 and 404. However, in certain embodiments, such discrete operations may be further divided into additional operations, combined into fewer operations, or eliminated, depending on the particular implementation without detracting from the essence of the disclosed embodiments.

Though FIG. 4 is described with respect to the extraction of the second set of features and the second set of weights, and the selection of the first set of features, the scope of the disclosure may not be so limited. The description of FIG. 4 may be similarly applicable to a training process of the classifier which may include extraction of a second plurality of features and a second plurality of weights, and a selection of a first plurality of features, as described, for example, in FIG. 6, without deviation from the scope of the disclosure.

Figure 5:
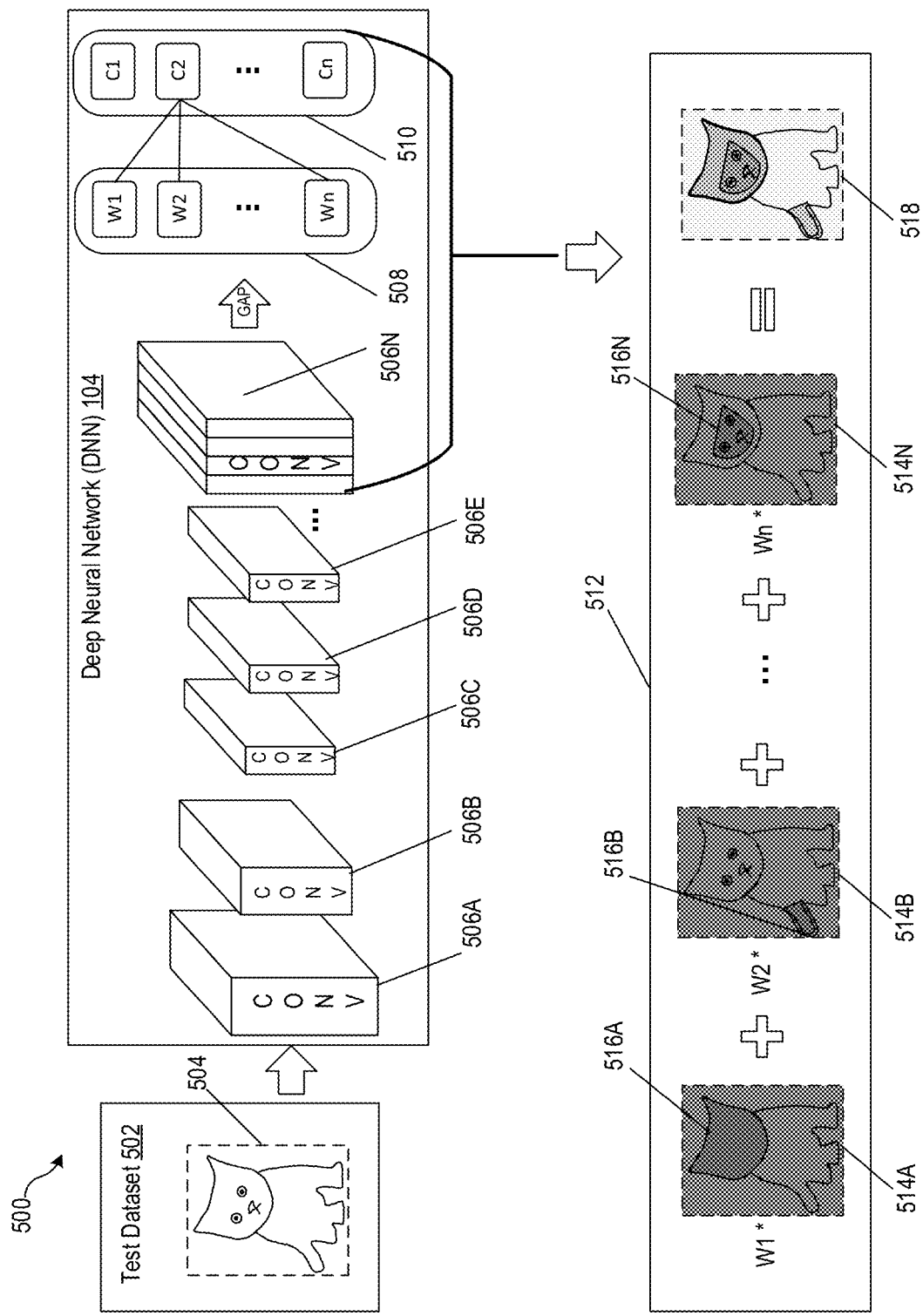
FIG. 5 illustrates an exemplary scenario to depict extraction of a set of features and a set of weights corresponding to the set of features from a Deep Neural Network (DNN)

FIG. 5 illustrates an exemplary scenario to depict extraction of a set of features and a set of weights corresponding to the set of features from a Deep Neural Network (DNN), arranged in accordance with at least one embodiment described in the present disclosure. FIG. 5 is explained in conjunction with elements from FIG. 1, FIG. 2, FIG. 3, and FIG. 4. With reference to FIG. 5, there is shown a test dataset 502. The test dataset 502 may be stored in either or combination of the memory 206, the persistent data storage 208, or the database 108. The test dataset 502 may include a first data point 504. In FIG. 5, the first data point 504 as image data (i.e. a cat image) is presented merely an example. Although, the test dataset 502 may include a plurality of data points including the first data point 504, and may include other types of data points, such as audio data, text data, or other digital signals, without deviation from the scope of the disclosure.

In FIG. 5, there is also shown the DNN 104. As described in FIG. 3 and FIG. 4, the processor 204 may be configured to control the DNN 104 to extract the first set of features and the first set of weights corresponding to the first set of features. In some embodiments, the processor 204 may extract the second set of features and the corresponding second set of weights from the DNN 104 and select the first set of features from the second set of features, as explained, for example, in FIG. 4. For the sake of brevity, FIG. 5 will be described with respect to the first set of features and the first set of weights, however, the scope of the disclosure may not be so limited. The description of FIG. 5 may be similarly applicable to the extraction of the second set of features and the second set of weights, without deviation from the scope of the disclosure.

As shown in FIG. 5, the DNN 104 may include a plurality of convolution layers including a first convolution layer 506A, a second convolution layer 506B, . . . and an Nth convolution layer 506N. The DNN 104 may be configured to receive the first data point 504 as data input to the first convolution layer 504A for classification by the DNN 104. The DNN 104 may further include a flatten layer 508 and an output layer 510 (or Fully Connected layer or Dense layer) that may respectively follow the Nth convolution layer 506N (or Activation layer) in the DNN 104.

In an embodiment, the Nth convolution layer 506N may include multiple activation maps associated with various features of the data input (such as, the first data point 504) input to the DNN 104. For example, the Activation layer (i.e., the Nth convolution layer 506N) may include 512 activation maps each with dimensions 2×2, where each feature may be associated with a particular activation map of the 512 activation maps. Accordingly, each of the 512 activation maps with the dimensions 2×2 may include four real numbers (i.e. set of feature values explained in FIGS. 3, 6, and 7). In such case, if $f_k$ represents the kth activation map, then k∈{1, 2, . . . 512}.

The DNN 104 may further include an average pooling layer (not shown in FIG. 5) between the Nth convolution layer 506N and the flatten layer 508. The average pooling layer may be configured to perform a Global Average Pooling (GAP) operation on the output of the Nth convolution layer 506N. Based on the GAP operation, the average pooling layer may be configured to reduce the size of the output from the Nth convolution layer 506N by averaging the activation map of each feature. In case of the above example, the average pooling layer may reduce the size of the activation maps of the features from the dimensions as "2, 2, 512" to reduced dimensions as "1, 1, 512". The flatten layer 508 may be configured to flatten the input to the flatten layer 508 without a change in information input to the flatten layer 508. In an example, the flatten layer 508 may convert the reduced dimensional vector, such as "1, 1, 512" (i.e. input to the flatten layer 508 from the average pooling layer) to a one-dimensional vector of features of the same size as the number of nodes in the output layer 510, as shown in FIG. 5. For example, the flatten layer 508 may provide 512 one-dimensional values for the 512 number of nodes in the output layer 510. The flatten layer 508 may include a set of weights (e.g., W1, W2, . . . Wn) that may correspond to the features (e.g., f1, f2, . . . fn) at the Nth convolution layer 506N.

The output layer 510 may include one node each for an output class associated with the DNN 104. The output layer 510 may receive an input of the one-dimensional vector of features and the set of weights corresponding to the features from the flatten layer 508. In an example, the output layer 510 may apply a SoftMax function to one-dimensional vector of each feature and weight corresponding to the feature to determine a probability of the input first data point 504 as being associated with a certain class of the DNN 104. The SoftMax function is represented in equation 1 below:

$$Pr(Y_i = K) = \frac{e^{\beta_K x_i}}{\sum_{k=1}^{K} e^{\beta_k x_i}} \quad (1)$$

where,
Pr( ) a probability function;
$Y_i$: a class output for $i^{th}$ data point;
$X_i$: a value of one-dimensional vector X of a feature;
$\beta_K$: a weight associated with a feature; and
K: an index associated with a class.

For example, the DNN 104 may be pre-trained to classify different living beings from an input image (e.g., the first data point 504). The DNN 104 may include a set of nodes (e.g., C1, C2, . . . Cn) in the output layer 510 for each class (e.g., a total of n classes) of living beings that the DNN 104 may be configured to predict. The DNN 104 may predict the first class for the first data point 504 (for example a cat), based on a probability for the first class at a corresponding node of the output layer 510. For example, the DNN 104 may obtain a probability value (i.e. first confidence score) of 0.85 at the node C2 of the output layer 510, which may correspond to the first class, such as, a cat label.

In FIG. 5, there is also shown a block 512 that depicts a process of the class activation mapping (CAM) for the predicted first class (e.g., a cat label) of the first data point 504 (i.e., the cat image). In an embodiment, based on the predicted first class of the first data point 504, the processor 204 may be configured to extract the activation maps (as the first set of features) associated with the features of the first data point 504 from the Nth convolution layer 506N. In an embodiment, the extraction of the set of feature values (i.e. 2*2 dimension) for each of the activation map may correspond to the extraction of the first set of features from the pre-trained DNN 104 as explained, for example, in step 306 of FIG. 3. Such extraction of the set of feature values (i.e. 2*2 dimension) for each of the activation map may correspond to the class activation mapping (CAM) process. The CAM process may be referred to as an interpretability analysis technique for the DNN 104, as the CAM process may determine a cause of classification (i.e. features responsible for prediction of DNN, either correct or incorrect) of the first data point 504 into the first class (e.g., the cat class). The CAM process may indicate a region of pixels in the first data point 504 that may lead to the classification of the first data point 504 into the first class (e.g., the cat class). The CAM process may also determine features and weights of these features that may contribute to a prediction of the first class for the first data point 504 by the DNN 104.

For example, the first set of features may include a first feature (f1), a second feature (f2), . . . and an Nth feature (fn), each of which may be associated with the predicted first class (e.g., cat) of the input cat image. Each feature may have an associated activation map, hereinafter referred as a feature map with the set of features values of 2*2 dimension. The feature map may be a heat map that may indicate regions or pixels in the input cat image that may be associated with the corresponding feature in the input cat image (i.e. first data point 504). The block 512 depicts a first feature map 514A related to the first feature (f1), which may be associated with, for example, a head portion 516A of a cat in the cat image. The block 512 further shows a second feature map 514B related to the second feature (f2), which may be associated with, for example, a tail portion 516B of a cat in the cat image. Similarly, the block 512 shows an Nth feature map 514N related to the Nth feature (fn), which may be associated with, for example, eyes, nose, and/or mouth (collectively referred as a face portion 516N) of a cat in the cat image.

In FIG. 5, the block 512 further shows the first set of weights, such as a first weight (W1), a second weight (W2), . . . and an Nth weight (Wn). The processor 204 may be configured to extract the first set of weights from the flatten layer 508. The first set of weights may correspond to the extracted first set of features (i.e. activation maps). In other words, each weight (e.g., an $i^{th}$ weight, $w_i$) may correspond to a feature (e.g., an $i^{th}$ feature, $f_i$) in the Nth convolution layer 506N (i.e. a layer that may precede the flatten layer 508 and/or the output layer 510 of the DNN). As shown in the block 512, the processor 204 may be configured to perform a weighted sum of the extracted set of features values of the first set of features and the first set of weights (corresponding to the first set of features) to obtain a class activation map 518 for the predicted first class of the first data point 504. The class activation map 518 may be the heat map that may indicate regions in the cat image that may correspond to various high-level features (and associated portions) of a cat in the cat image. In other words, the class activation map 518 may identify and localize positions of a cat in the cat image. Therefore, the processor 204 may be configured to extract the set of features values (2*2 dimension) of each of the first feature (f1), the second feature (f2), . . . and the Nth feature (fn), as the first set of high-level features, and extract the corresponding first set of weights values, from the DNN 104. Hence, the disclosed electronic device 102 may perform the class activation mapping (CAM) process (or referred as interpretability analysis) on the DNN 104 to extract the set of features values for each high-level feature (i.e. each of the first set of features) and the corresponding set of weights, which were used for the prediction performed by the DNN 104 for the first data point 504. The class activation mapping (CAM) process (or referred as interpretability analysis) may extract all the features (i.e. top features) from the DNN 104 were responsible in the DNN 104 for either correct prediction (i.e. the first class) or incorrect prediction (i.e. other class). The training of the classifier (i.e. orthogonal to the DNN 104) on such extracted features (e.g. feature values and corresponding weight) and their correlation with correct/incorrect predictions, may allow the trained classifier to validate the correctness of the prediction of the DNN 104 or flag potential mis-predictions of the DNN 104 during the real-time operation (for example an automatic object detection in an autonomous vehicle). The training of the classifier for a particular class based on the extracted features and weights is further described, for example, in FIGS. 6 and 7.

Figure 7:
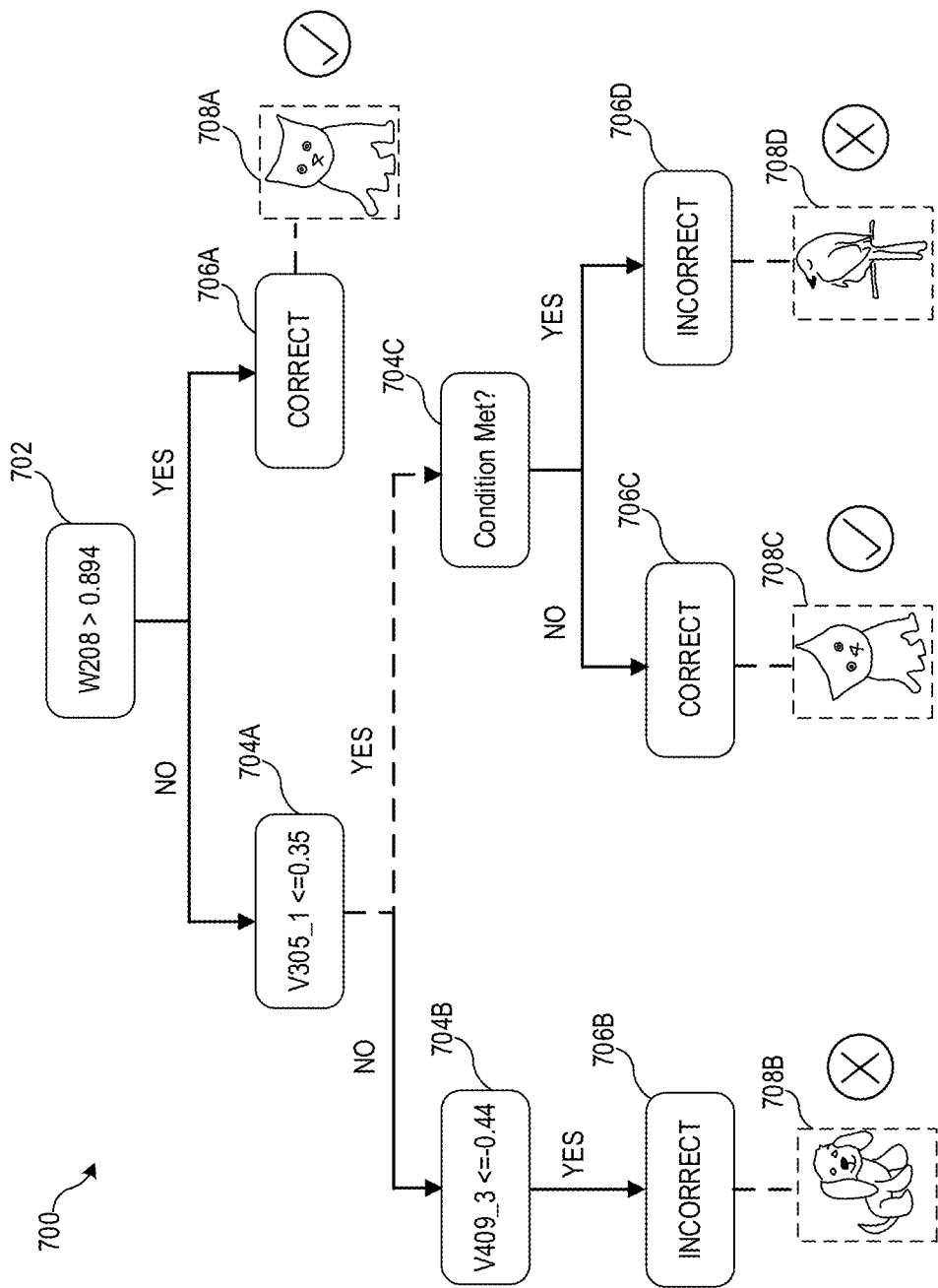
FIG. 7 illustrates an exemplary decision tree classifier for validation of a prediction result of a Deep Neural Network (DNN), all according to at least one embodiment described in the present disclosure.

The processor 204 may be further configured to use the extracted first set of features (or the set of feature values for each feature) and the first set of weights for the determination of the second confidence score, and determination of the output information to validate or indicate the correctness of the prediction of the first class of the DNN 104, as explained in detail, for example, in FIGS. 3 and 7.

Figure 6:
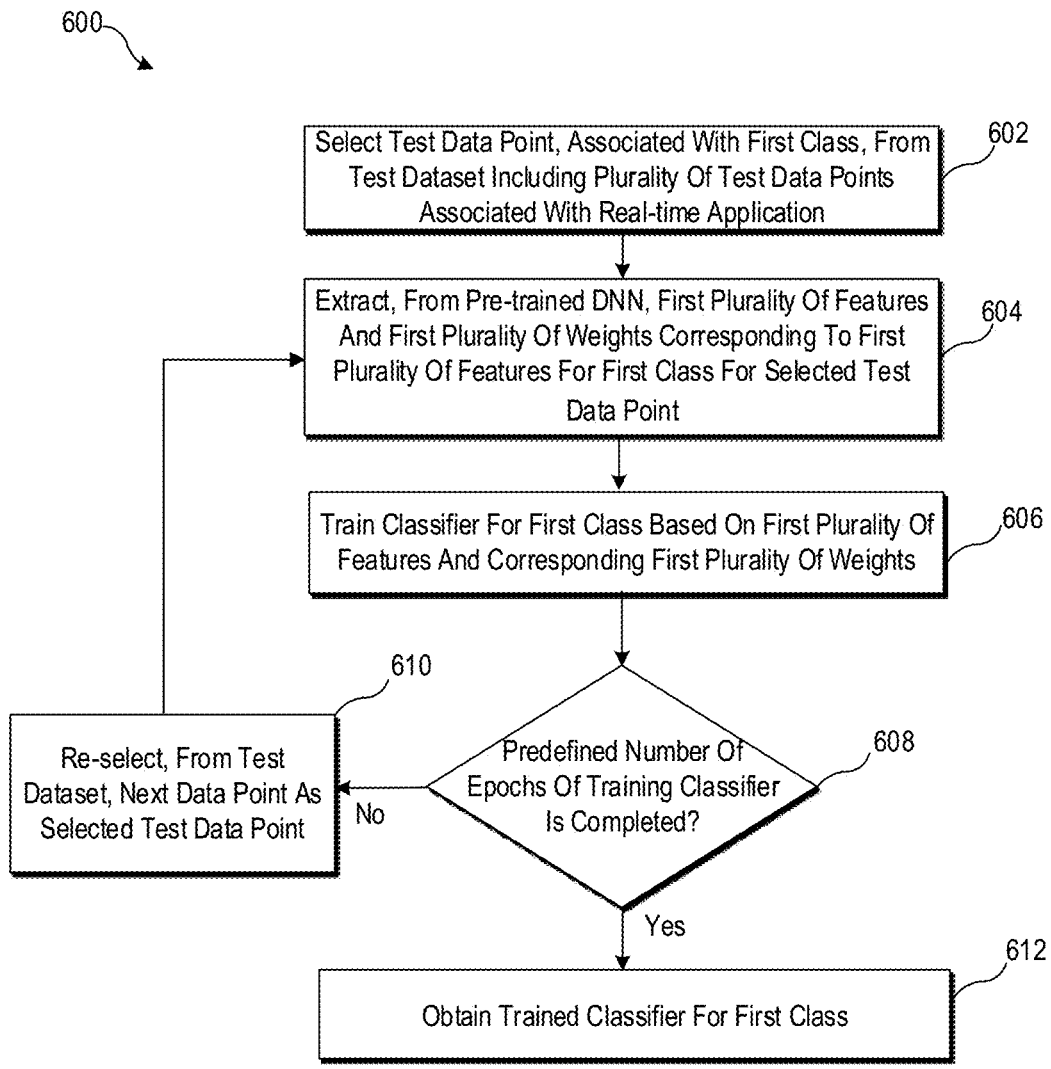
FIG. 6 is a flowchart of an example method for training of a classifier for validation of a prediction result of a Deep Neural Network (DNN)

FIG. 6 is a flowchart of an example method for training of a classifier for validation of a prediction result of a Deep Neural Network (DNN), according to at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or the example system 202 of FIG. 2. For example, one or more of the electronic device 102 or a classifier (e.g., the first classifier 106A) from the set of classifiers 106 may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

At block 602, a test data point may be selected. In one or more embodiments, the processor 204 may be configured to select the test data point from a test dataset including a plurality of test data points associated with a real-time application. The test data point (for example a cat image) may be associated with a first class (i.e. cat) on which the DNN 104 may be pre-trained. The test dataset may be stored in either or combination of the memory 206, the persistent data storage 208, or the database 108. The processor 204 may receive the test data point from one of the memory 206, the persistent data storage 208 or the database 108.

For example, the test data point may include, but is not limited to, an image, audio/speech samples, text characters, software instructions, or other forms of digital signals, such as but not limited to, electrical bio-signals, motion data, or depth data. Examples of the real-time applications may include, but are not limited to, an image recognition application, an image classification application, a speech recognition application, a text recognition application, a malware detection application, an autonomous vehicle application, an anomaly detection application, a machine translation application, or pattern recognition application from digital signals/data.

In an embodiment, the test dataset may include a first set of test data points associated with the first class and a second set of test data points associated with one or more classes other than the first class. Each test data point in the test dataset may have an associated known pre-assigned class (a ground truth associated with the test data point). The processor 204 may select the test data point (e.g., a cat image) from the first set of test data points associated with the first class (e.g., a cat) to train a classifier (e.g., the first classifier 106A associated with the first class) from the set of classifiers 106. In an embodiment, the processor 204 may control the set of classifiers 106 to get trained on each class associated with the DNN 104.

At block 604, a first plurality of features and a first plurality of weights corresponding to the first plurality of features may be extracted for the first class of the test data point. In one or more embodiments, the processor 204 may be configured to control the DNN 104 to extract the first plurality of features and the first plurality of weights corresponding to the first plurality of features for the first class of the test data point, from the pre-trained DNN 104. The processor 204 may extract the first plurality of features and the first plurality of weights from a convolution layer of the DNN 104, for example, that may precede an output layer of the DNN 104, as explained with respect to the first set of features and the first set of weights, for example, in FIGS. 3 and 5. Further, based on the extraction of the first plurality of features, the processor 204 may obtain a set of feature values for each feature of the first plurality features and obtain a weight corresponding to the feature, from the first plurality of weights, as described, for example, in FIG. 5. For example, for the test data point as a cat image, the processor 204 may extract the plurality of high-level features as a head of a cat, a tail of a cat, or a face of a cat. For each feature, the processor 204 may obtain a 2×2 feature matrix (or activation map) of four real numbered values (as the set of feature values) and a corresponding weight as another real number. The extraction of the first plurality of features and the first plurality of weights from the DNN 104 is explained in detail, for example, in FIG. 5 with respect to the first set of features (i.e. further used to determine the correctness of the prediction of the DNN 104 as explained, for example, in FIG. 3).

In some embodiments, the processor 204 may be configured to extract a second plurality of features and a second plurality of weights corresponding to the second plurality of features from the convolution layer of the DNN 104. Further, the processor 204 may be configured to select the first plurality of features from the extracted second set of features based on application of a predefined selection criteria on the second plurality of weights. In such scenario, the extraction of the first plurality of features may correspond to the selection of the first plurality of features from the second plurality of features. The predefined selection criteria may be to select Top N features or to select all the features with the corresponding weight more than the predefined weight threshold as described, for example, in step 404 of FIG. 4.

At block 606, a classifier (e.g., the first classifier 106A) may be trained for the first class (e.g., a cat). In one or more embodiments, the processor 204 may be configured to train the first classifier 106A for the first class (e.g., a cat) based on the first plurality of features and the first plurality of weights corresponding to the first plurality of features extracted from the DNN 104 as described, for example, in step 306 of FIG. 3 and FIG. 5. In an example, the first classifier 106A may be one of a decision tree classifier, a Support Vector Machine (SVM) classifier, a Naïve Bayes classifier, a Logistic Regression classifier, or a k-nearest neighbor classifier. In an embodiment, each of the set of classifiers 106 may include one type of classifier, for example the decision tree classifier. In another embodiment, each of the set of classifiers 106 may include different types of classifiers.

In an embodiment, to train the first classifier 106A, the processor 204 may be configured to correlate one or more first features, from the first plurality of features, with a correct prediction for the selected test data point. Further, the processor 204 may be further configured to correlate one or more second features, from the first plurality of features, with an incorrect prediction for the selected test data point. In other words, for training the first classifier 106A, the processor 204 may set conditions in the first classifier 106A such that the first classifier 106A may establish a correlation of the one or more first features with the correct prediction (for example a cat class label) for the selected test data point (e.g. cat image). Further, the first classifier 106A may establish or learn another correlation of the one or more second features with the incorrect prediction (e.g. dog class label) for the selected test data point (e.g. cat image). For the training of the first classifier 106A, an example of a set of feature values and weights corresponding to two exemplary features (i.e. one or more first features and one or more second features) for two exemplary test data points of cat images is presented in Table 1, as follows:

TABLE 1

Example values of features and weights for training of a classifier

| Test Data point | Class at which Classifier is trained | First Feature (Set of feature values and Weight) | Second Feature (Set of feature values and Weight) | Predicted First class of the DNN | Result of Classifier |
|---|---|---|---|---|---|
| Image-1 (Cat) | Cat | Values = {0.1, 0.03, 1.2, 2.3} Weight = 0.6 | . . . | Cat | Correct |
| Image-2 (Cat) | Cat | . . . | Values = {0.3, 0.07, 1.5, 3.6} Weight = 0.7 | Dog | Incorrect |

It should be noted that data provided in Table 1 may merely be taken as experimental data and may not be construed as limiting the present disclosure.

As shown in Table 1, a first test data point may correspond to an Image-1 of a class "cat" and a second test data point may correspond to an Image-2 of the same class "cat". For example, for the training of the first classifier 106A for the first class (i.e. "cat" as per column 2 of Table 1), the DNN 104 may output or predict a correct classification result as a "cat" (i.e. predicted first class shown in column 5 of Table 1), and may also output or predict an incorrect classification result, say as a dog (i.e. predicted first class shown in column 5 of Table 1) for the Image-2. The extracted first set of features may include a first feature, a second feature . . . , and a Nth Feature. As shown in columns 3-4 of Table 1, the set of feature values for the first feature (e.g., a head portion of a cat) may include real numbers such as, 0.1, 0.03, 1.2, and 2.3 and the corresponding weight as 0.6. Based on a higher value of the weight (i.e., 0.6), one of the feature values for the first feature (e.g., 2.3), and the predicted class of the DNN 104 (i.e. column 5 of Table 1), the processor 204 may correlate the first feature (and the corresponding feature values and weight) with the correct prediction result for the training of the first classifier 106A for the class (e.g. cat). In other words, for the test data point of 'cat', the extracted first feature (for example, head portion) may be used by the DNN 104 to predict the correct class as "cat". Thus, to train the first classifier 106A, the processor 204 may correlate the first feature (and the corresponding set of feature values and weight) with the correct prediction. This may indicate that the first classifier 106A may learn that, for the test data point (as 'cat'), the extracted first feature (i.e. head portion) may help the DNN 104 to correctly predict the test data point as "cat". Thus, the first feature (or other one or more first features) may be the correct feature pattern of the DNN 104 to be learned by the classifier, because using such correct feature, pattern the DNN 104 predict correctly. Therefore, based on the learning or training of the correlation between the first feature and the correct prediction for the test data point, the trained classifier (i.e. first classifier 106A) may determine the correctness of prediction to validate the DNN 104 as described in steps 308 and 310 of FIG. 3.

Similarly, as shown in column 4 of Table 1, the set of feature values for the second feature (e.g., a tail of a cat) may include real numbers such as, 0.3, 0.07, 1.5, and 3.6 and weight as 0.7. Based on a higher value of the weight (i.e., 0.7), one of the feature values for the second feature (e.g., 3.6), and the predicted class of the DNN 104 (i.e. column 5 of Table 1), the processor 204 may correlate the second feature (and the corresponding feature values and weight) with the incorrect prediction result for the training of the first classifier 106A for the class (i.e. cat). In other words, for the test data point of 'cat', the extracted second feature (for example, tail portion) may be used by the DNN 104 to predict the incorrect class as "dog" (as shown in column 5 in Table 1). Thus, to train the first classifier 106A, the processor 204 may correlate the second feature (and the corresponding set of feature values and weight) with the incorrect prediction. This may indicate that the first classifier 106A may learn that, for the test data point (as 'cat'), the extracted second feature (i.e. tail portion) may be the incorrect or wrong feature due to which the DNN 104 may incorrectly predict the test data point (as 'cat') into an incorrect class as "dog". Therefore, based on the learning or training of the incorrect correlation between the second feature and incorrect prediction for the test data point, the trained classifier (i.e. first classifier 106A) may determine the correctness of prediction to validate the DNN 104 as described in steps 308 and 310 of FIG. 3. Such learning or training of the incorrect predictions and the responsible features for the incorrect prediction of the DNN 104 may correspond to learning error patterns of the DNN 104 by the classifier (for example the first classifier 106A). Therefore, the classifier may be trained on the correlation of high-level features leading to the correct prediction (i.e. correct patterns) of the DNN 104 and on the correlation of high-level features leading to the incorrect prediction of the DNN 104 to effectively determine the correctness of the prediction of the DNN 104 at higher accuracy.

In some embodiments, the first classifier 106A may correspond to, for example, a decision tree classifier that may include a set of internal nodes and a set of leaf nodes. Each of the set of internal nodes may represent a condition associated with a feature of the first plurality of features and the corresponding weight of the feature. Each of the set of leaf nodes may represent a prediction output of the decision tree classifier. After completion of the training of the decision tree classifier, the prediction output of the decision tree classifier may correspond to the second confidence score associated with a predicted class of an input data point of the DNN 104. The processor 204 may determine the conditions associated with the set of feature values of each of the first plurality of features and the first plurality of weights, for the set of internal nodes of the decision tree classifier, to generate and train the decision tree classifier, as described, for example, in FIG. 7. Examples of the techniques that may be used by the processor 204 to train the decision tree classifier may include, but are not limited to, an Iterative Dichotomiser 3 (ID3) algorithm, a C4.5 algorithm, a classification and regression tree (CART) algorithm, a Chi-square automatic interaction detection (CHAID) algorithm, a Multi-variate adaptive regressive splines (MARS) algorithm, or a Conditional inference tree algorithm. An example of a decision tree classifier and the conditions set for the training of the decision tree classifier is explained in detail, for example, in FIG. 7.

At block 608, a check may be performed to determine whether a predefined number of epochs of training of the first classifier 106A are completed. In one or more embodiments, the processor 204 may be configured to perform the check. In an example, the predefined number of epochs may be one of 30 or 50. In case the predefined number of epochs of the training are completed, control may pass to block 612. Otherwise, control may pass to block 610.

At block 610, a next data point may be re-selected from the test dataset as the selected test data point. In one or more embodiments, the processor 204 may be configured to re-select the next data point from the test dataset as the newly selected test data point to further train the classifier (for example the first classifier 106A) with all the test data point in the test dataset for the first class. Control may pass to block 604 and re-iterate the steps 604 and 606 of FIG. 6, based on the newly selected test data point.

At block 612, a trained classifier (e.g., the first classifier 106A) may be obtained for the first class associated with the pre-trained DNN 104. In one or more embodiments, the processor 204 may be configured to obtain the trained first classifier 106A for the first class (e.g., a cat) based on the training of the first classifier 106A for the predefined number of epochs. Control may pass to end.

Although the flowchart 600 is illustrated as discrete operations, such as 602, 604, 606, 608, 610, and 612. However, in certain embodiments, such discrete operations may be further divided into additional operations, combined into fewer operations, or eliminated, depending on the particular implementation without detracting from the essence of the disclosed embodiments.

In some embodiments, the disclosed electronic device 102 may train the set of classifiers 106 for corresponding classes associated with the DNN 104 using the test dataset based on aforementioned operations mentioned in the flowchart 600. The set of classifiers 106, once trained, may be used to validate the prediction results or the correctness of the prediction of the DNN 104. For example, the processor 204 may use the first classifier 106A trained for the first class (for example 'cat') to validate a predicted outcome of the first class (for example 'cat') of the DNN 104. Further, the processor 204 may use the second classifier 106B trained for a second class (for example 'aero plane') to validate a predicted outcome of the second class (for example 'aero plane') of the DNN 104, and so on. The validation of the prediction outcomes of the DNN 104 by a corresponding classifier (i.e. selected from the set of classifiers 106 during the real-time operation of the DNN 104) may be an orthogonal validation technique that may not depend on the DNN 104 and/or its parameters, and thereby may be extrinsic to the DNN 104. Such orthogonal validation technique may provide an enhanced validation accuracy as compared to certain conventional solutions.

FIG. 7 illustrates an exemplary decision tree classifier for validation of a prediction result of a Deep Neural Network (DNN), arranged in accordance with at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a decision tree classifier 700. The decision tree classifier 700 may be stored in either or combination of the memory 206, the persistent data storage 208, or the database 108. The decision tree classifier 700 may include a set of internal nodes including a root node 702, a first internal node 704A, a second internal node 704B, and a third internal node 704C. The decision tree classifier 700 may further include a set of leaf nodes including a first leaf node 706A, a second leaf node 706B, a third leaf node 706C, and a fourth leaf node 706D. Further, in FIG. 7, there is shown an exemplary set of images including a first image 708A, a second image 708B, a third image 708C, and a fourth image 708D.

In an example, the processor 204 may use the trained decision tree classifier 700 (for example as the first classifier 106A) to validate a class predicted by the pre-trained DNN 104 for an input image or an input data point. For example, the decision tree classifier 700 may be pre-trained to validate a class "cat" associated with the input image to the DNN 104. In other words, the processor 204 may be configured to use the decision tree classifier 700 to validate or trust the prediction result of the DNN 104, in case the prediction result of the DNN 104 is the class "cat". As shown in FIG. 7, the set of images 708A to 708D may be associated with respective leaf nodes from the set of leaf nodes 706A to 706D. The set of images 708A to 708D may be examples of the input image of the DNN 104 for a predicted class. For example, the first image 708A may be a cat image that may be indicated as a "CORRECT" classification by the decision tree classifier 700.

In an embodiment, each of the set of internal nodes including the root node 702 and remaining nodes (i.e., the nodes 704A to 704C) may represent a condition to determine a decision associated with the first data point (e.g., an input image of the DNN 104). In an embodiment, the condition may be associated with a feature value from the set of feature values (e.g., four values) of each of the first plurality of features, or a weight from the first plurality of weights corresponding to the first plurality of features, as described, for example, in FIGS. 5 and 6. The first plurality of features (as high-level features) and the corresponding first set of features may be extracted based on the class activation mapping (CAM) process (or referred as interpretability analysis) from the DNN 104, as described, for example, in FIGS. 5 and 6. In some embodiments, the features and the corresponding weights may be extracted based on gradient based CAM process (i.e. grad-CAM).

For example, the root node 702 may represent a condition for a weight corresponding to a $208^{th}$ feature, such as, "W208>0.894" (i.e. value of the weight of the $208^{th}$ feature greater than 0.894). The root node 702 may be most important node which may be set with the condition for the most important feature (e.g. $208^{th}$ feature from the top features extracted from the DNN 104). Further, the first internal node 704A may represent a condition for a first value of the four values (i.e. set of feature values) of a $305^{th}$ feature, such as, "V305_1<0.35", and the second internal node 704B may represent a condition for a third value of the four values (i.e. set of feature values) of a $409^{th}$ feature, such as, "V409_3<=-0.44", and so on. Similar to the root node 702, the first internal node 704A, and the second internal node 704B, there may be N number of internal nodes (for example as shown in FIG. 7 by at least the third internal node 704C) with multiple conditions which are checked by the trained decision tree classifier 700 to further validate the correctness of the DNN 104.

During the training of the decision tree classifier 700 (refer FIG. 6), the processor 204 may assign a probability value to each of the set of leaf nodes 706A to 706D. The probability value represented by a certain leaf node of the decision tree classifier 700 may be the second confidence score associated with the class predicted by the pre-trained DNN 104 for the first data point (e.g., the input image). In other words, the probability value or the second confidence score at a certain leaf node may be used to validate the predicted class of the DNN 104 as described, for example, at steps 308 of FIG. 3. In an embodiment, the probability value may be an orthogonal confidence score of the decision tree classifier 700. In some embodiments, the second confidence score may be a discrete value of either 0 (indicative of an "INCORRECT" prediction) or 1 (indicative of a "CORRECT" prediction) based on a comparison of the probability value with a threshold value (e.g., 0.5). For example, the second confidence score for the probability value of less than 0.5 may be determined as "0" and the second confidence score for the probability of greater than 0.5 may be determined as "1". In other embodiments, the second confidence score may be the same as the probability value of the leaf node.

For example, as shown in FIG. 7, for the decision tree classifier 700 (trained for the class as cat), the first leaf node 706A may represent a "CORRECT" prediction (e.g., a value of "1" for the second confidence score) associated with the image class of "cat", as may be evident by the first image 708A of a cat. On the other hand, the second leaf node 706B may represent an "INCORRECT" prediction (e.g., a value of "0" for the second confidence score) for the image class of "cat" based on the set condition in the second internal node 704B for the $409^{th}$ feature of the features extracted from the DNN 104 based on the CAM process (i.e. interpretability analysis). The incorrect prediction may be evident by the second image 708B of a dog. FIG. 7 further shows that the third leaf node 706C may represent a "CORRECT" prediction and the fourth leaf node 706D may represent an "INCORRECT" prediction for the image class of "cat" based on the set condition in the third internal node 704B. This may be evident by the third image 708C of a cat and the fourth image 708D of a bird, as shown in FIG. 7.

The decision tree classifier 700 depicted in FIG. 7 may be an exemplary pre-trained classifier of the set of classifiers 106, however, the scope of the disclosure may not be so limited. The set of classifiers 106 may include other classifiers including, but not limited to, a Support Vector Machine (SVM) classifier, a Naïve Bayes classifier, a Logistic Regression classifier, or a k-nearest neighbor classifier. Hence, the decision tree classifier 700 (i.e. one of the set of classifiers 106) may be trained by the disclosed electronic device 102 on the decision conditions (at each of a root node 702 and the set of internal nodes 704A-704C) based on the correlation established between the features (i.e. set of feature values) and the corresponding weights (i.e. extracted from the DNN 104 based on CAM process) and the correct or incorrect prediction (i.e. indicated by the set of leaf nodes 706A-706D). Such trained classifier (such as the decision tree classifier 700 orthogonal to the DNN 104) may store or learn all the correct predictions and related correct features (i.e. success patterns) and/or incorrect predictions and related wrong features (i.e. error pattern) of the DNN 104, to further validate the correctness of the DNN 104 and further enhance the prediction accuracy of the DNN 104 in various real-time application.

An exemplary dataset and experimental setup for the disclosure is presented in Table 2, as follows:

TABLE 2

Exemplary dataset and experimental setup of the disclosure

| Dataset and Experimental setup | Values |
|---|---|
| Dataset used | Canadian Institute For Advanced Research (CIFAR)-10 image dataset with 50000 training images and 10000 test images of 10 categories including aero plane, automobile, bird, cat, dog, deer, frog, horse, ship, and truck |
| DNN used | Visual Geometry Group (VGG)-16 convolutional neural network |
| Convolution layer used for feature extraction | A last convolution layer that precedes the output layer of the DNN |
| Feature selection criteria | Selection of top 10 features from the last convolution layer by weights |
| Classifier used | Decision tree classifier (tree size: 97 and number of leaf nodes: 49) |
| Experimented class | "Dog" class |
| Number of instances | 881 images |
| Correct classifications | 826 of 881 images correctly classified as "dog" |
| Incorrect classifications | 55 of 881 images incorrectly classified as "dog" |
| Data Balancing used | Over-sampling |
| Evaluation metric | Precision and recall |

It should be noted that data provided in Table 2 may merely be taken as experimental data and may not be construed as limiting the present disclosure.

An exemplary experiment data of the validation of prediction results of a DNN by a pre-trained classifier is presented in Table 3, as follows:

TABLE 3

Exemplary experimental data of validation of prediction results of a DNN

| Actual Image Class | Correct classification | Incorrect classification |
|---|---|---|
| Dog | 51 | 4 |
| Others | 0 | 55 |

From Table 3, it may be observed that out of a total of a first set of 55 test images of "dog" class, 51 images may be correctly validated by the trained classifier (i.e. trained for "dog" class) to belong to the "dog" class, and the rest 4 images may be incorrectly validated as not belonging to the "dog" class. Accordingly, the precision of the experimental data represented for the trained classifier in Tables 2-3 may be 93%. Further, for each of a second set of 55 test images of other classes, the same classifier (i.e. trained on dog class) may determine that the images may be incorrectly classified to a "dog" class. In other words, the classifier may determine that none of the second set of test images may belong to the "dog" class. Accordingly, the recall may be 100%.

Various embodiments of the disclosure may provide one or more non-transitory computer-readable storage media configured to store instructions that, in response to being executed, cause a system (such as the example system 202) to perform operations. The operations may include receiving a first data point associated with a real-time application. The operations may further include predicting, by a Deep Neural Network (DNN) pre-trained for a classification task of the real-time application, a first class associated with the received first data point. The operations may further include extracting, from the DNN, a first set of features and a first set of weights corresponding to the first set of features, for the predicted first class of the first data point. The extracted first set of features may be associated with a convolution layer of the DNN. The operations may further include determining, by a pre-trained classifier associated with the predicted first class, a confidence score for the predicted first class for the first data point based on the extracted first set of features and the corresponding first set of weights. The operations may further include generating output information to indicate correctness of the prediction of the first class for the first data point based on the determined confidence score.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   receiving a first data point associated with a real-time application;
   predicting, by a Deep Neural Network (DNN) pre-trained for a classification task of the real-time application, a first class associated with the received first data point;
   extracting, from the DNN, a first set of features and a first set of weights corresponding to the first set of features, for the predicted first class of the first data point, the extracted first set of features are associated with a convolution layer of the DNN;
   determining, by a pre-trained classifier associated with the predicted first class, a confidence score for the predicted first class for the first data point based on the extracted first set of features and the corresponding first set of weights; and
   generating output information to indicate correctness of the prediction of the first class for the first data point based on the determined confidence score.

2. The method according to claim 1, the extraction of the first set of features, further comprising:
   extracting, from the DNN, a second set of features and a second set of weights corresponding to the second set of features, the extracted second set of features are associated with the convolution layer of the DNN; and
   selecting the first set of features from the second set of features based on the second set of weights.

3. The method according to claim 2, wherein the selection of the first set of features from the second set of features, further comprising:
   comparing each of the second set of weights corresponding to the second set of features with a predefined weight threshold; and
   selecting the first set of features from the second set of features based on the comparison.

4. The method according to claim 2, wherein the selection of the first set of features from the second set of features, further comprising:
   sorting the second set of features based on an application of a predefined sorting criteria on the second set of weights corresponding to the second set of features; and
   selecting the first set of features from the sorted second set of features.

5. The method according to claim 1, wherein the convolution layer corresponds to a layer that precedes an output layer of the DNN.

6. The method according to claim 1, further comprising:
   comparing the determined confidence score with a predefined score threshold; and
   generating the output information to indicate the correctness of the prediction of the first class based on the comparison.

7. The method according to claim 1, wherein the output information corresponds to at least one of: a display of the confidence score, a storage of the confidence score in a log file, or a notification based on the confidence score.

8. The method according to claim 1, further comprising:
   selecting the pre-trained classifier for the predicted first class, from a set of pre-trained classifiers each associated with a corresponding class of the pre-trained DNN; and
   determining, by the selected pre-trained classifier, the confidence score of the predicted first class for the first data point.

9. The method according to claim 1, further comprising:
   determining the confidence score for the predicted first class for the first data point based on a correlation of one or more first features of the convolution layer of the DNN with a correct prediction and a correlation of one or more second features of the convolution layer of the DNN with an incorrect prediction,
   wherein the first set of features include the one or more first features and the one or more second features.

10. The method according to claim 9, wherein each feature from the one or more first features and the one or more second features includes a set of feature values, and wherein the correlation with the correct prediction or the incorrect prediction of the first class is based on the set of feature values and weight corresponding to each feature.

11. The method according to claim 1, wherein training of the classifier for the first class comprising:
    selecting a test data point, of the first class, from a test dataset of a plurality of test data points associated with the real-time application, the test dataset includes a first set of test data points associated with the first class and a second set of test data points associated with one or more classes other than the first class;
    executing a first set of operations for training of the classifier for the first class, the first set of operations comprise:
      extracting, from the pre-trained DNN, a first plurality of features and a first plurality of weights corresponding to the first plurality of features for the first class of the selected test data point, the extracted first plurality of features are associated with the convolution layer of the DNN,
      training the classifier for the first class based on the extracted first plurality of features and the corresponding first plurality of weights, and
      re-selecting, from the test dataset, a next test data point as the selected test data point; and
    obtaining the pre-trained classifier for the first class by iteratively executing the first set of operations for the test dataset based on the selected test data point.

12. The method according to claim 11, the extraction of the first plurality of features, further comprising:
    extracting, from the DNN, a second plurality of features and a second plurality of weights corresponding to the second plurality of features, the extracted second plurality of features are associated with the convolution layer of the DNN; and selecting the first plurality of features from the second plurality of features based on the second plurality of weights.

13. The method according to claim 11, wherein the training of the classifier for the first class, further comprising:

correlating one or more first features, from the first plurality of features, with a correct prediction for the selected test data point; and correlating one or more second features, from the first plurality of features, an incorrect prediction for the selected test data point.

14. The method according to claim 1, wherein the pre-trained classifier corresponds to one of a decision tree classifier, a Support Vector Machine (SVM) classifier, a Naïve Bayes classifier, a Logistic Regression classifier, or a k-nearest neighbor classifier.

15. The method according to claim 1, wherein the pre-trained classifier includes:

a set of internal nodes each of which represents a condition associated with a feature of the first set of features and the corresponding weight of the feature; and a set of leaf nodes each of which represents a prediction output including the confidence score associated with the predicted first class for the first data point.

16. The method according to claim 1, wherein the first data point corresponds to one of image data, audio data, or text data.

17. The method according to claim 1, wherein the real-time application comprises one of an image classification, a speech recognition, or text recognition.

18. One or more non-transitory computer-readable storage media configured to store instructions that, in response to being executed, cause a system to perform operations, the operations comprising:

receiving a first data point associated with a real-time application;

predicting, by a Deep Neural Network (DNN) pre-trained for a classification task of the real-time application, a first class associated with the received first data point;

extracting, from the DNN, a first set of features and a first set of weights corresponding to the first set of features, for the predicted first class of the first data point, the extracted first set of features are associated with a convolution layer of the DNN;

determining, by a pre-trained classifier associated with the predicted first class, a confidence score for the predicted first class for the first data point based on the extracted first set of features and the corresponding first set of weights; and generating output information to indicate correctness of the prediction of the first class for the first data point based on the determined confidence score.

19. A system, comprising:

a Deep Neural Network (DNN) pre-trained for a classification task of a real-time application; and a processor, coupled with the DNN, configured to:

receive a first data point associated with the real-time application;

predict, by the pre-trained DNN, a first class associated with the received first data point;

extract, from the pre-trained DNN, a first set of features and a first set of weights corresponding to the first set of features, for the predicted first class of the first data point, the extracted first set of features are associated with a convolution layer of the DNN;

determine, by a pre-trained classifier associated with the predicted first class, a confidence score for the predicted first class for the first data point based on the extracted first set of features and the corresponding first set of weights; and generate output information to indicate correctness of the prediction of the first class for the first data point based on the determined confidence score.

20. The system according to claim 19, wherein the output information corresponds to at least one of a display of the confidence score, a storage of the confidence score in a log file, or a notification based on the confidence score.

* * * * *